Feb. 16, 1960 G. C. PEARCE ET AL 2,925,204
STORING AND DISPENSING DEVICE
Filed March 14, 1958 2 Sheets-Sheet 1
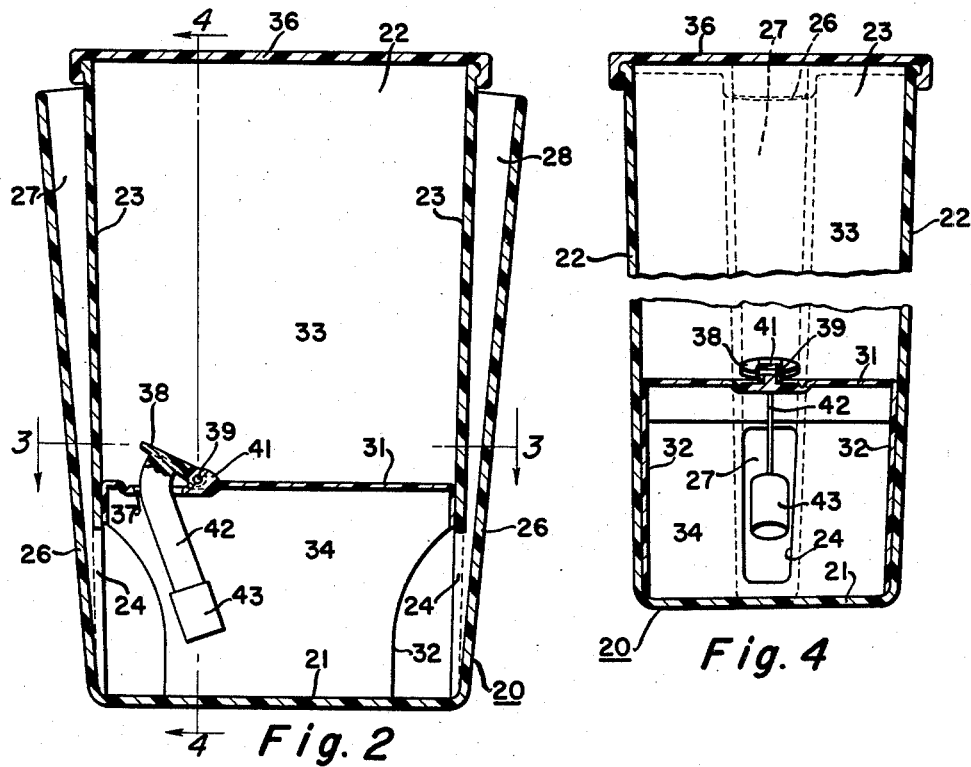
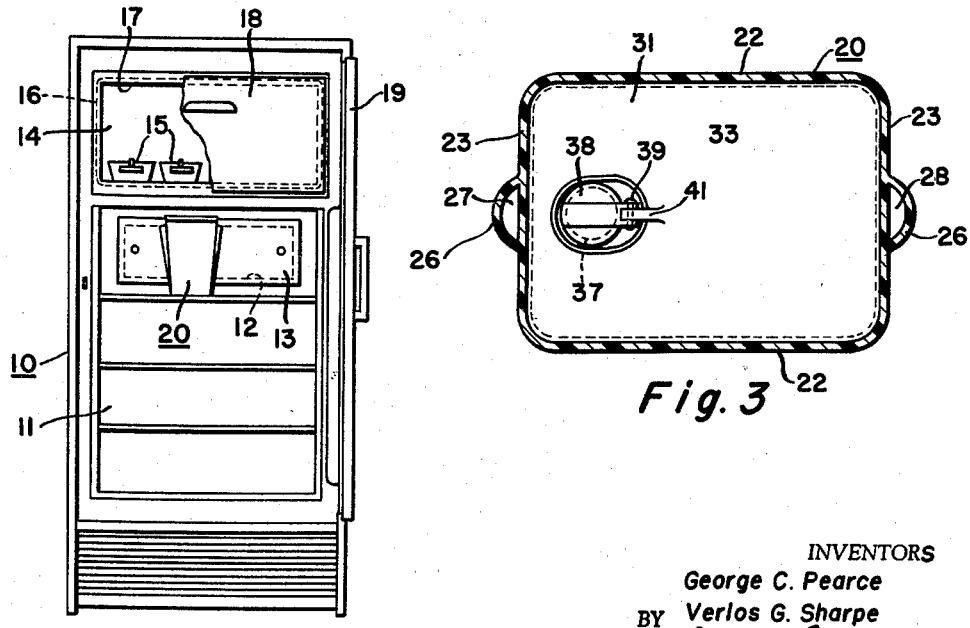
INVENTORS
George C. Pearce
Verlos G. Sharpe
BY
Their Attorney Feb. 16, 1960  G. C. PEARCE ET AL  2,925,204
STORING AND DISPENSING DEVICE
Filed March 14, 1958  2 Sheets-Sheet 2

INVENTORS
George C. Pearce
BY Verlos G. Sharpe

Their Attorney

United States Patent Office 2,925,204
Patented Feb. 16, 1960

2,925,204

STORING AND DISPENSING DEVICE

George C. Pearce and Verlos G. Sharpe, Dayton, Ohio, assignors to General Motors Corporation, Detroit, Mich., a corporation of Delaware Application March 14, 1958, Serial No. 721,597

3 Claims. (Cl. 222—431)

This invention relates to a dispenser device and particularly to a substance storage and dispensing container for use in conjunction with mechanically refrigerated household refrigerators.

The container of the device of our invention is adapted to be substantially filled with water and placed in an unfrozen food storage compartment of a household refrigerator cabinet to chill the contained water. The container is provided with opposed discharge outlets or spouts and when tilted in one direction an unmeasured amount of cooled water may be poured therefrom through a spout for one purpose. Tilting of the container in an opposite direction automatically renders a metering device incorporated therein effective to restrict flow of liquid therefrom through the other spout thereof and limits such flow to a measured amount for another purpose. The device is particularly designed to increase the utility of a cool water storage receptacle employed in the use of a household refrigerator cabinet.

The primary object of our invention is to provide a device for selectively dispensing a measured amount of a substance from a container thereof and/or for dispensing therefrom an unmeasured amount of the substance.

Another object of our invention is to provide in a substance container a normally ineffective metering means which is rendered effective automatically to selectively dispense different amounts of the substance therefrom.

A further object of our invention is to provide a container device which is tiltable in opposite directions for dispensing a substance therefrom with means therein responsive automatically to tilting the container in one direction for limiting flow of the substance whereby a predetermined measured amount only thereof will be dispensed from the container upon each tilting movement.

A still further object of our invention is to provide a storage and dispensing device or container which is simple in construction and operation, is of light weight and can be manufactured at low cost both material-wise and labor-wise.

Further objects and advantages of the present invention will be apparent from the following description, reference being had to the accompanying drawings, wherein a preferred form of the present invention is clearly shown.

In the drawings:

Figure 1 is a front view of a household refrigerator with the cabinet door open and showing a water storage and dispensing device of our invention located in a food compartment thereof;

Figure 2 is an enlarged vertical sectional view of the device of our invention;

Figure 3 is a horizontal sectional view of the device taken on the line 3—3 of Figure 2;

Figure 4 is a broken sectional view taken on the line 4—4 of Figure 2 showing the pivotal mounting of a valve in a container of the device;

Figure 5:
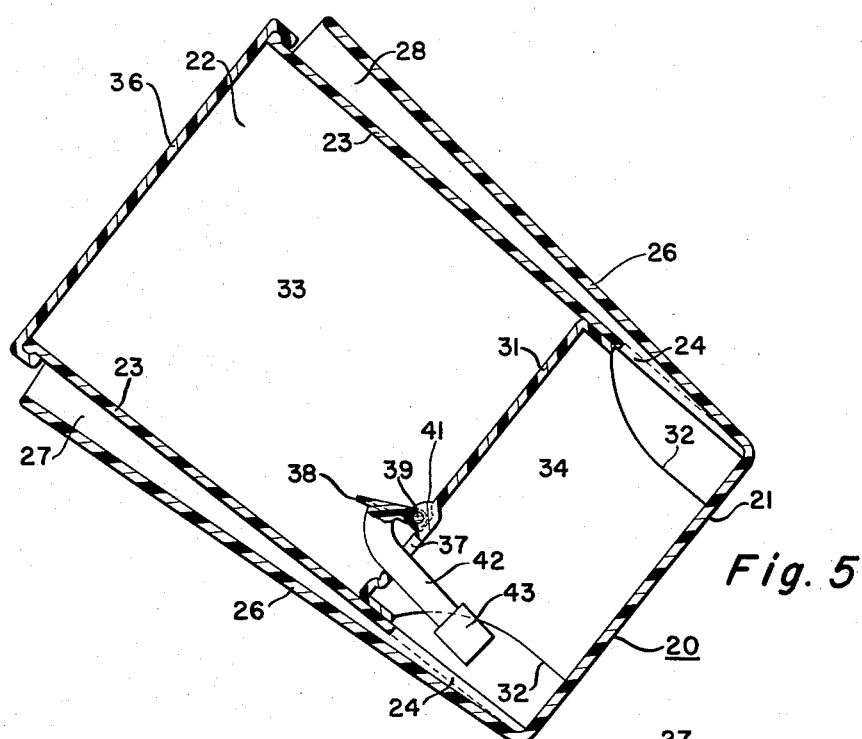
Figure 5 shows the container device tilted in one direction for dispensing an unmeasured amount of a substance therefrom.

Referring to the drawings, wherein our invention is illustrated in use with a refrigerator, we show in Figure 1 thereof a refrigerating apparatus including an insulated household refrigerator cabinet 10 of the multiple compartment type. Cabinet 10 is provided with a lower unfrozen food storage compartment 11 which is cooled to a temperature above freezing by a plate-like sheet metal evaporator 12, of a closed refrigerating system (not shown) associated with the cabinet, mounted behind a protecting or concealing cover or baffle 13. Cabinet 10 is also provided with an upper frozen food storage compartment 14 which is cooled to a temperature well below 32° F. for the storage of frozen foods, for freezing and/or for freezing water in freezing devices 15 removably disposed in compartment 14 into ice blocks or cubelets which when released from a freezing device 15 are for table use in chilling salads or the like and drinks. The ice block making or freezing devices 15 are preferably of the unitary type including a tray and a grid locked therein as shown and fully described in the patent to A. J. Frei 2,809,499 dated October 15, 1957. Compartment 14 is refrigerated by a second evaporator 16 of the refrigerating system which second evaporator is in the form of a conduit coiled or wrapped around the outside of and secured to a metal can-like member 17 forming the liner or inner walls of compartment 14. A door 18, shown broken away in Figure 1, is hingedly mounted at the front of compartment 14 to provide an individual closure for the access opening thereof as is conventional. Another insulated main door structure 19, hingedly mounted on cabinet 10 and shown in open position, extends across the front of both compartments 11 and 14 and is provided with a resilient gasket for sealingly engaging the front of the refrigerator. A liquid storing and dispensing device generally represented by the reference numeral 20 in Figure 1 and shown more clearly in detail in other figures of the drawing is supported on a shelf within the main or lower unfrozen food storage compartment 11 of cabinet 10.

In accordance with our invention the utility of a liquid storing and dispensing device 20 lies in its use in conjunction with a refrigerator and in the capability of the device to at one time discharge a measured amount of water and at another time to discharge an unmeasured amount of water therefrom for purposes to be hereinafter more specifically described. The device 20 is substantially rectangular in horizontal cross section and comprises a container or receptacle having a bottom wall 21, upright side walls 22 and upright end walls 23. Each end wall 23 is cut out as at 24 and an integral portion of these walls adjacent the cut out opening 24 therein is bowed outwardly as at 26 or is so shaped to provide the device or container with opposed inclined spouts or discharge outlet passages 27 and 28. A platform or partition 31 having a pair of supporting legs 32 is inserted into the container of device 20 and divides the interior thereof into separate superimposed upper and lower chambers 33 and 34 respectively. Both spouts or discharge outlets 27 and 28 communicate with the one or lower chamber 34 within container 20. The horizontal partitioning portion of platform 31 is provided with a downwardly directed flange located above the top of the openings 24 and is secured thereat in any suitable manner such, for example, as by cementing the flange to walls 22 and 23 of the container. A resilient molded plastic cover or cap is snapped over or fitted upon the top of walls 22 and 23 of container 20 for closing the upper chamber 33. Cap or cover 36 is flexible and therefore removable from container 20 so as to permit rapid filling of the chambers 33 and 34 therein and preferably water seals the open top of chamber 33. The platform or partition 31 has a port 37 therein providing a passageway between chambers 33 and 34 and a valve 38, pivotally mounted by a pin 39 upon a raised ear portion 41 of the partition, is adapted to control the port or passageway 37. Valve 38 has a stem 42 depending therefrom and extending through the port 37. The lower end of valve stem 42 is enlarged as at 43 or it may be weighted with a metal insert if desired. The particular location of the component parts of valve 38 with respect to one another and with respect to its pivotal mounting gravitationally holds or balances the valve in a normal open position to maintain the port or passageway 37 open when the container 20 is supported in an upright position. In other words the enlarged or weighted end 43 of valve stem 42 tends to assume a position in substantially vertical alignment with the pivotal mounting of valve 38. Port opening 37 in partition 31 and valve 38 form or provide a restricting or metering means in container 20 operable or functionable as and for a purpose to be presently described. The upper part of walls 26 may be marked with suitable indicia to indicate to a user of the container 20 that a measured amount of substance contained therein can be poured from spout 28 and/or an unmeasured amount thereof poured from spout 27. Various walls and other parts of container 20 including the valve or metering means 38 may be formed of molded plastic material of any desired and now well known composition. Container 20 is preferably of a capacity to contain a sufficient amount of water to fill several of the freezing devices 15 or a pitcher or a plurality of drinking glasses.

Figure 6:
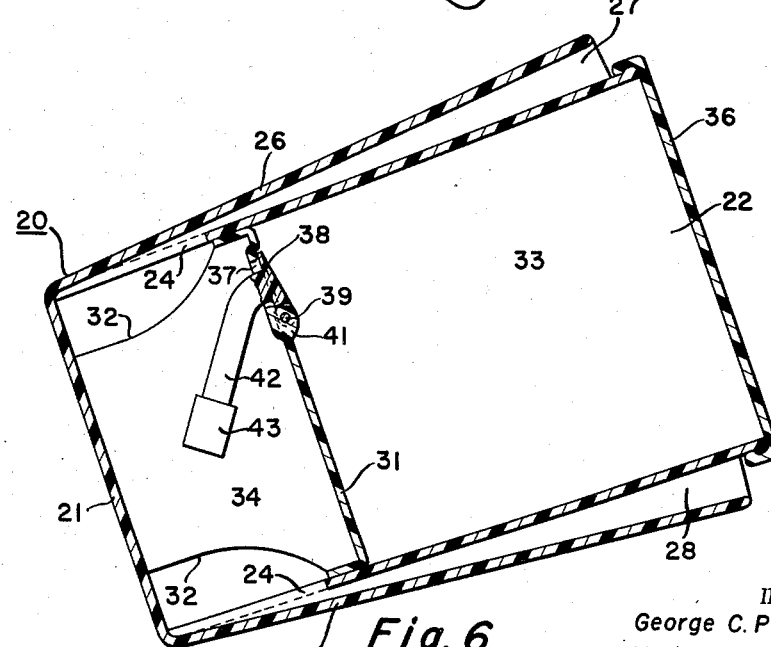
Figure 6 is a view similar to Figure 5 showing the container device tilted in another direction for dispensing a measured amount of a substance therefrom.

Assume that the container of a device 20 has been substantially filled with water and has been stored in an upright position within compartment 11 of refrigerator 10 a sufficient length of time to chill the water to a low temperature and it is now desired to remove some of the chilled water therefrom. For example it may be desirable to pour cool water from container 20 into a pitcher or glasses for drinking purposes or it may, without necessitating carrying an emptied freezing device 15 to the sink, be desirable to pour a measured or metered amount of the cool water from container 20 into a tray of a freezing device 15. In the former example the container 20, after opening the refrigerator door 19, is swung or rotated to position the spout 27 toward the front of cabinet 10. Container 20 is then tilted upon its shelf support in the direction of spout 27 or to the left as viewed in Figure 5 of the drawings forwardly with respect to compartment 11 whereupon an unrestricted or unmeasured amount of the cool water will flow from the chambers 33 and 34 through the discharge outlet spout 27 into a pitcher or glass held thereunder. The metering means or valve 38 in container 20 remains balanced in the position thereof shown in Figure 2 during this tilting and water pouring act and is therefore ineffective to restrict or limit flow of water from the chambers 33 and 34 of container 20 through spout 27. During this tilting and unrestricted pouring operation the partitioning wall 31 is merely moved downwardly along the stem 42 of balanced valve 38 while port or passageway 37 remains open (see Figure 5). In the latter of the examples mentioned container 20 is swung or rotated to position the spout 28 toward the front of cabinet 10 and is then tilted upon its shelf support in the direction of spout 28 or to the right as viewed in Figure 6 of the drawings forwardly with respect to compartment 11. Valve 38 remains balanced in the position thereof shown in Figure 2 of the drawings while tilting the container in this opposite direction and the partitioning wall 31 moves upwardly into engagement with valve 38, upon initially tilting container 20, whereby the valve closes port 37 to shut off communication between chambers 33 and 34 and to trap water in the upper chamber 33 (see Figure 6). Continued tilting of container 20 in the direction of spout 28 or to the right tends to more tightly close valve 38 on its seat and causes flow of a measured amount of cooled water from chamber 34 through spout 28 into the tray of a freezing device 15 held thereunder. The measured amount of water discharged from container 20 through spout 28 is predetermined by the size of chamber 34 and its capacity is preferably sufficient to fill a tray of a freezing device 15 to a desired level. The sealing engagement of cap 36 with walls 22 and 23 prevents escape of water out of the top of chamber 33 when container 20 is tilted. Upon uprighting the container 20, after emptying water from chamber 34 thereof, valve 38 remains in its balanced position and port 37 is thereby opened to permit water previously trapped in chamber 33 to then flow into chamber 34 to again ready the container for another dispensation of water therefrom. In this fashion one or more of the freezing devices 15 can, after emptying ice therefrom, be successively filled with pre-chilled water without necessity of transporting a device 15 to the sink and filling it with warm tap water. This eliminates tracking water, which splashes from the tray of a freezing device while returning the water filled device from a sink to the refrigerator, across the kitchen floor and increases the utility of a water storing, chilling and dispensing receptacle or container device. We have described the use device 20 during support thereof on a shelf in the refrigerator cabinet but it is to be understood that the device may be removed from compartment 11 and tilted while holding same outside the refrigerator cabinet.

It should, from the foregoing, be apparent that our novel substance storing device or container is automatic in use depending upon the direction in which it is tilted to dispense different amounts of a substance therefrom. In this manner we eliminate the necessity of equipping such a container device with means which must be manually preset or adjusted prior to each dispensing operation or act. Our device is of light weight since walls of the container thereof are constructed of non-metallic material to facilitate handling thereof. The construction and arrangement of the valve or metering means within the container is such that the device is substantially fool proof and will be infallible in operation even after upending the device for cleaning and draining same. By our invention we increase the utility of a water storage and chilling container or receptacle used in conjunction with household refrigerator cabinets.

While the form of embodiment of the invention as herein disclosed constitutes a preferred form, it is to be understood that other forms might be adopted, as may come within the scope of the claims which follow.

What is claimed is as follows:

1. A substance storing and dispensing device comprising, a container having superimposed chambers therein normally communicating with one another, said container having an integral wall at one side with a portion thereof spaced from and other portions contiguous with the one container side wall to form a first pouring passage thereon, said container also having an integral wall at its side opposite said one side with a portion thereof spaced from and other portions contiguous with said container opposite side wall to form a second pouring passage thereon, each of said pouring passages being open at their upper end to the exterior of said device and extending downwardly from a point adjacent the top of said container, said pouring passages each being closed along their downward extension with the bottom end of both opening into the lowermost of said chambers in spaced apart relation to one another at opposite sides of said container, means in said container adapted to close off communication between said chambers, said device being tiltable to cause flow of the substance from the container thereof, the tilting of said device in a direction of said first pouring passage flowing the substance therethrough out of both of said chambers, and said means being rendered effective automatically in response to tilting said device in the direction of said second pouring passage to flow the substance therethrough out of said lowermost chamber only of the device.

2. A storage and dispensing device adapted to be tilted for selectively discharging a substance therefrom in an unmeasured amount or in a predetermined measured amount comprising, a container having integral walls at its opposed sides with a portion thereof spaced from and other portions contiguous with the side walls of said container to form separated pouring passages thereon, each of said pouring passages being open at their upper end to the exterior of said container and extending downwardly from a point adjacent the container top, said pouring passages being closed along their downward extension with the bottom end thereof opening into the lowermost portion of said container at its said opposed sides in spaced apart relation to one another, a metering means in said container, said means being effective upon tilting said device in a direction toward one of said pouring passages for flowing said unmeasured amount of the substance therethrough out of said container, and said means being rendered effective automatically in response to tilting said device in an opposite direction toward the other of said pouring passages for limiting flow of the substance therethrough out of said container to said measured amount.

3. In a generally rectilinear-shaped substance container, a partition in said container dividing the interior thereof into upper and lower chambers, a port in said partition providing communication between said chambers, said container having integral walls at its opposed sides with a portion thereof spaced from and other portions contiguous with the walls of the container to form separated pouring passages thereon, each of said pouring passages being open at their upper end to the exterior of said container and extending downwardly from a point adjacent the top thereof across said upper chamber, said separate pouring passages being closed along their downward extension with the bottom end of both opening into said lower chamber in spaced apart relation to one another at opposite sides of said container, valve means for controlling the port in said partition, said valve means being normally open during the act of tilting said container in a direction of one of said pouring passages to flow an unmeasured amount of substance therethrough from the container, and said valve means closing said port automatically in response to tilting said container in a direction of the other of said separated pouring passages whereby a measured amount of substance is poured therethrough from said lower chamber only of the container.

References Cited in the file of this patent

UNITED STATES PATENTS

| | | |
|---|---|---|
| 110,166 | Snow | Dec. 13, 1870 |
| 679,144 | Hardesty | July 23, 1901 |
| 2,010,126 | Akers | Aug. 6, 1935 |
| 2,069,089 | Goldman et al. | Jan. 26, 1937 |